United States Patent [19]

Pirri et al.

[11] Patent Number: 5,224,988
[45] Date of Patent: Jul. 6, 1993

[54] PROCESS FOR IMPROVING THE DISPERSIBILITY AND FILTERABILITY OF SCLEROGLUCAN POWDERS

[75] Inventors: Rosangela Pirri, Montardon; Yves Huet, Carentan; Alain Donche, Jurancon, all of France

[73] Assignee: Societe Nationale Elf Aquitaine, Courbevoie, France

[21] Appl. No.: 870,296

[22] Filed: Apr. 17, 1992

[30] Foreign Application Priority Data

Apr. 19, 1991 [FR] France .................. 91 04841

[51] Int. Cl.$^5$ ................................ C08L 5/00
[52] U.S. Cl. ..................... 106/208; 106/205; 106/206
[58] Field of Search .............. 106/198, 205, 206, 208

[56] References Cited

U.S. PATENT DOCUMENTS

| | | |
|---|---|---|
| 3,301,848 | 1/1967 | Halleck . |
| 3,801,502 | 4/1974 | Hitzman . |
| 3,853,771 | 12/1974 | Felmann et al. . |
| 4,212,748 | 7/1980 | Ferrell et al. . |
| 4,519,844 | 5/1985 | Chaux et al. ................. 106/208 |
| 4,640,358 | 2/1987 | Sampath ...................... 106/208 |
| 4,654,086 | 3/1987 | Baird et al. .................. 106/208 |
| 4,803,264 | 2/1989 | Krijnen et al. ............... 106/208 |

FOREIGN PATENT DOCUMENTS 2577982 8/1986 France .
2600336 12/1987 France .

OTHER PUBLICATIONS

Whistler et al, *Industrial Gums*, Academic Press, N.Y., 1973, pp. 488-489, 500-501.

Primary Examiner—David Brunsman
Attorney, Agent, or Firm—Birch, Stewart, Kolasch & Birch

[57] ABSTRACT

Process for improving the dispersibility and the filterability of scleroglucan powders, in which a surfactant is incorporated in the coagulated polymer. The powder obtained according to the process has a dispersibility and a filterability after drying of the coagulum which are greatly superior to those of a powder treated after drying with the same quantity of surfactant or of a powder in solution treated with this same quantity of surfactant.

15 Claims, 3 Drawing Sheets

PROCESS FOR IMPROVING THE DISPERSIBILITY AND FILTERABILITY OF SCLEROGLUCAN POWDERS

The present invention relates to a process improving the dispersibility and the filterability of water-soluble polymers when these polymers are packaged in powder form. This process is applicable to natural (extracted) polymers, to fermentation polymers and especially to scleroglucan, and to synthetic polymers, each time the process of manufacture of the polymer includes a stage of separation by precipitation by means of a nonsolvent.

Water-soluble polymers have found many industrial applications, especially in the petroleum field, in particular for improved recovery of hydrocarbons, for the prevention of water irruptions and for modification of the injection profile, in the case of which operations the treatment may consist in injecting water-soluble polymers at the level of the strata whose permeability at right angles to the well it is intended to reduce.

The water-soluble polymers employed in these various petroleum applications are required to have precise characteristics, two of which are particularly important, namely the viscosity and the filterability of the solutions prepared from these polymers. A high viscosity is indispensable to good control of mobility of the fluid in the formation, and a high viscometric efficiency ensures lower operating costs. Good filterability is essential to avoid blocking the formation into which the solution is injected. Dispersibility is also a characteristic to be taken into account. In fact, a high dispersibility promotes a rapid development of viscosity and restricts the use of mechanical dispersers, in which the shear reduces the yield of the product. This characteristic, which is of value when the treatment is performed onshore becomes of great importance in the case of offshore treatments. Under offshore conditions the storage capacities are, in fact, limited, and good dispersibility avoids long maturing of the solutions and excessive immobilisation of these storage capacities.

Available water-soluble polymers, be they natural polymers, fermentation polymers or synthetic polymers, all have a filterability and often a dispersibility which are inadequate to various degrees. These poor characteristics are frequently inherent in the process of manufacture of the polymer. Some stages of the processes sometimes take place under severe mechanical, thermal or chemical conditions which give rise to polymer aggregation factors, structural damage or impurities. These factors are responsible for aggregates of polymer molecules, called microgels, which, even when present in small quantity, considerably reduce the filterability of the solutions to be injected into the reservoir.

Many processes have been proposed in the prior art to improve the filterability and dispersibility of solutions of water-soluble polymers and thus to obtain a satisfactory injectability of these solutions into the reservoir. In very many cases these processes apply to the water-soluble polymer only once it has been dissolved. Among these processes there may be mentioned the incorporation of surfactants in the polymer solution. French Patent 2,600,336 and U.S. Pat. Nos. 3,853,771, 3,801,502 and 4,212,748, for example, recommend the use of surfactants to improve the injectivity of solutions of water-soluble polymers.

It should be noted, however, that while positive results can be obtained with these various processes, they all present a handicap which rules them out. Since they apply to the polymer once it has been dissolved, their application necessarily takes place on the oil production site, and this involves additional costs and specialised teams to carry out the treatments. As a result, no process for improving the filterability of water-soluble polymers in solution appears to be functioning on an industrial scale at this time.

To get round this difficulty, a number of processes producing a formulation which can be exploited directly have been proposed, some of which produce a fluid composition of the polymer and others directly with the polymer in powder form, which are preferred by the oil producers because of their limited bulk. An improvement in the dispersibility of the powder obtained is claimed, for example, in U.S. Pat. No. 4,654,086 by mixing a surfactant with xanthan powder. The process described in French Patent 2,577,982 shows that the addition of alkali metal lignosulphonate to xanthan powders, scleroglucan and polyacrylamides appreciably improves the dispersibility of these water-soluble polymers and the filterability of the resulting solutions. It must be noted, however, that water-soluble polymer powders are well known, on the one hand, to have a poor dispersibility which affects the final viscosity of the solutions and, on the other hand, to produce solutions of more mediocre filterability than those from which they are derived. The origin of these poor characteristics of the water-soluble polymer powders is to be found in the process producing the fermentation must of the polymer powder. This change from a liquid form to a solid form tends to degrade. In the case of fermentation polymers, xanthan and scleroglucan, the solution containing the polysaccharide is mixed with an equivalent or larger volume of an organic nonsolvent, generally isopropanol. This operation, called coagulation, precipitates the polysaccharide in the form of a fibrous mass, still filled with water and with nonsolvent. This precipitate, called coagulum, is then pressed to remove as much as possible of the liquid phase impregnating it, and is then broken into pieces, dried and ground. A xanthan or scleroglucan powder is collected at the end of these operations. Despite the great precautions which are taken, some deterioration in the quality of the polymer cannot be avoided, due to a partial denaturing of its structure which, if excessive, can go as far as to make the polymer insoluble.

As demonstrated in the prior art and especially in French Patent 2,577,982, the incorporation of surfactants makes it possible to restore to the denatured powders a dispersibility and a filterability which in turn makes it possible to envisage their injection into the reservoir. It has been found, in a completely unexpected manner, that the incorporation of surfactants in the polymer can be advantageously carried out when the polymer is still in the form of coagulum and especially when this polymer is a polysaccharide of the scleroglucan type.

Figure 1:
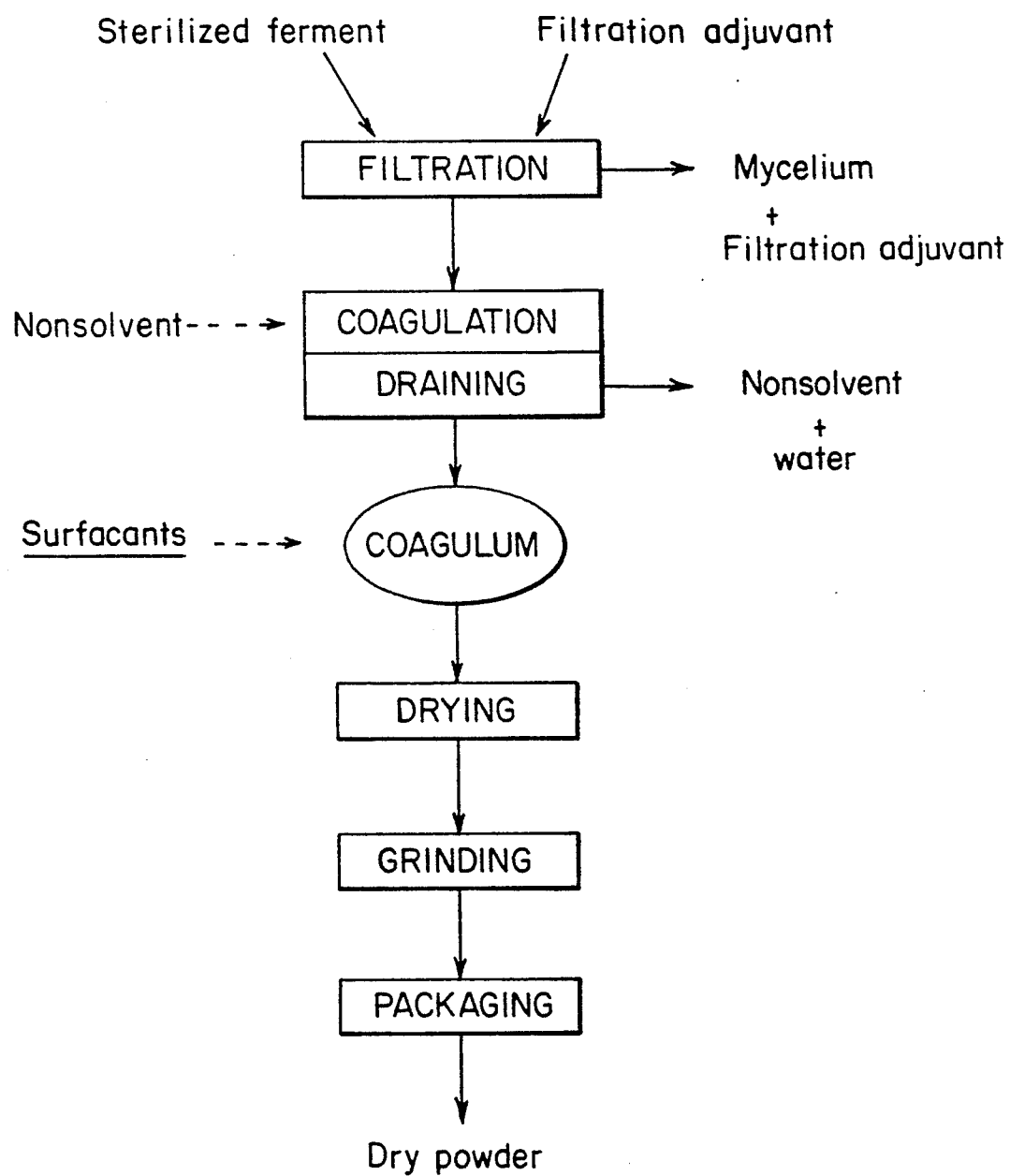
FIG. 1 describes the conventional process for the preparation of scleroglucan powders by coagulation and incorporation of the surfactants as proposed according to the invention.

The process according to the invention relates to a process for the manufacture of a water-soluble polymer powder of high dispersibility and of high filterability, characterised in that the solution containing the polymer is mixed with a volume of a nonsolvent in sufficient quantity to precipitate the polymer in coagulum form, an agent consisting of at least one surfactant capable of improving dispersibility and filterability is then incorporated in the coagulum, the coagulum thus treated is then pressed to remove as much as possible of the liquid phase which impregnates it, it is broken into pieces, dried, and the product resulting from the above operations is finally ground until a powder is obtained.

The polymer employed is advantageously a polysaccharide obtained by fermentation and in particular scleroglucan, the nonsolvent then employed being preferably isopropanol.

The scleroglucan which forms part of the compositions of the present invention is nonionic water-soluble homopolysaccharides of molecular weight exceeding 500,000, whose molecules consist of a linear main chain made up of D-glucose units linked by 1,3-$\beta$ bonds and one out of three of which is linked to a side D-glucose unit by a 1,6-$\beta$ bond. This polysaccharide is obtained by fermentation of a medium based on sugar and inorganic salts under the action of microorganisms of sclerotium type and especially of Sclerotium rolfsii (ATCC 15 206). A more complete description of scleroglucan and of its preparation can be found in U.S. Pat. No. 3,301,848, which will be included in the present description.

As a source of scleroglucan it is recommended to employ the polysaccharide isolated from the fermentation medium after filtration of the mycelium of the producer fungus. The latter would give the scleroglucan solution a blocking characteristic incompatible with injection into the reservoir. The coagulum precipitated by a nonsolvent from the fermentation medium which no longer contains mycelium will be advantageously employed for the incorporation of surfactants.

The surface-active agent employed according to the invention consists either of at least one anionic surfactant or of at least one nonionic surfactant or of a mixture of these two types of surfactants. The surfactants chosen will have to exhibit a certain lipophilic (hydrophobic) character characterised by a hydrophile-lipophile balance (HLB) lower than 18 and preferably higher than 12. The HLB coefficient corresponds to the formula HLB=20 (Mo/M) in which Mo is the mass of the hydrophilic fraction of the molecule and M its total mass.

For example, the anionic surface-active agent employed may be:

fatty acid soaps such as sodium or potassium salts of $C_6$-$C_{24}$ saturated or unsaturated fatty acids or of aminocarboxylic acids such as sodium N-laurylsarconisate, sulphates and sulphated products such as alkali metal alkyl sulphates of the sodium lauryl sulphate type, polyoxyethylenated fatty alcohol sulphates, polyoxyethylenated alkylphenol sulphates and polyoxyethylenated arylalkylphenol sulphates, phosphoric esters of oxyethylenated derivatives such as polyoxyethylenated fatty alcohol phosphates, polyoxyethylenated alkylphenol phosphates and polyoxyethylenated arylalkylphenol phosphates, alkali metal sulphonates such as alkylsulphonates, for example alkylsulphonic esters of $C_4$-$C_{30}$ acids of the sodium dialkylsulphosuccinate type, alkylbenzenesulphonates such as sodium nonylbenzenesulphonate and sodium dodecylbenzenesulphonate and lignosulphonates.

As nonanionic, neutral surfactants, a preferred class of the invention, there may be envisaged:

polyoxyethylenated alkylphenols such as polyoxyethylenated nonylphenol, polyoxyethylenated dinonylphenol, polyoxyethylenated tributylphenol and polyoxyethylenated dodecylphenol polyoxyethylenated and/or polyoxypropylenated fatty alcohols and fatty acids polyoxyethylenated and/or polyoxypropylenated fatty acid alkanolamides, polyol esters such as glycerol or propylene glycol esters of fatty acids, of alimentary oils and fats, of mixtures of fatty acids and of acetic and/or lactic and/or citric and/or tartaric acid, sucrose esters such as sugar esters and sugar glycerides, sorbitan fatty acid esters and their polyoxyethylenated and polyoxypropylenated derivatives such as polyoxyethylenated polyethylene glycol or polypropylene glycol esters, polyoxyethylenated sorbitan esters and polyoxyethylenated oleic glycerides.

The surfactants found particularly advantageous are polyoxyethylenated mono-, di- and trialkylphenols containing between 8 and 40 polyoxyethylene units and preferably between 16 and 24 units.

In the process according to the invention it is particularly advantageous to subject the coagulum to the action of a mixer during the incorporation of the surface-active agent. It is also advantageous to predissolve the surface-active agent in a minimum quantity of nonsolvent, if need be with the addition of a little water, but the surfactant may also be introduced as it is, if it is liquid at the temperature of the coagulum, or molten, if it is solid at this temperature. The coagulum is then dried, ground and packaged as a dry powder using the operating processes which are conventional in the profession.

The incorporation of the surfactants in the coagulum brings about a remarkable improvement in filterability and dispersibility when compared with the traditional process consisting in impregnating the dry powder with these same surfactants. In fact, with the same quantity of surfactants incorporated in the scleroglucan, the filterability and the dispersibility of the scleroglucan powder originating from the treated coagulum are superior to those of the directly treated scleroglucan powder. Furthermore, it is shown that, in the case of the same filterability, the quantities of surfactants incorporated in the coagulum are three to four times smaller than those incorporated in the dry powder. It must also be noted that, with the recommended surfactants according to the invention, it is remarkable that the incorporation of surfactants in the coagulum does not spoil the quality of the powder to which it gives rise until a high content is reached, whereas under the same conditions the powder which is treated directly has a pasty consistency, incompatible with its conveying and its handling. In addition, the coagulum impregnated with water and nonsolvent permits easy and homogeneous impregnation of the surfactant in the molten form or in solution in a certain quantity of water and of nonsolvent. This operation therefore does not require any special equipment, whereas the direct impregnation of the powder is a tricky operation which, even with a relatively low surfactant content, results in sticky powders of poor appearance.

These advantages, and others, will appear more clearly on reading the figures and the examples which follow, which illustrate the invention without, however, limiting it.

The diagram shown in FIG. 1 describes the conventional process for the preparation of scleroglucan powders by coagulation and incorporation of surfactants as proposed according to the invention.

Figure 2:
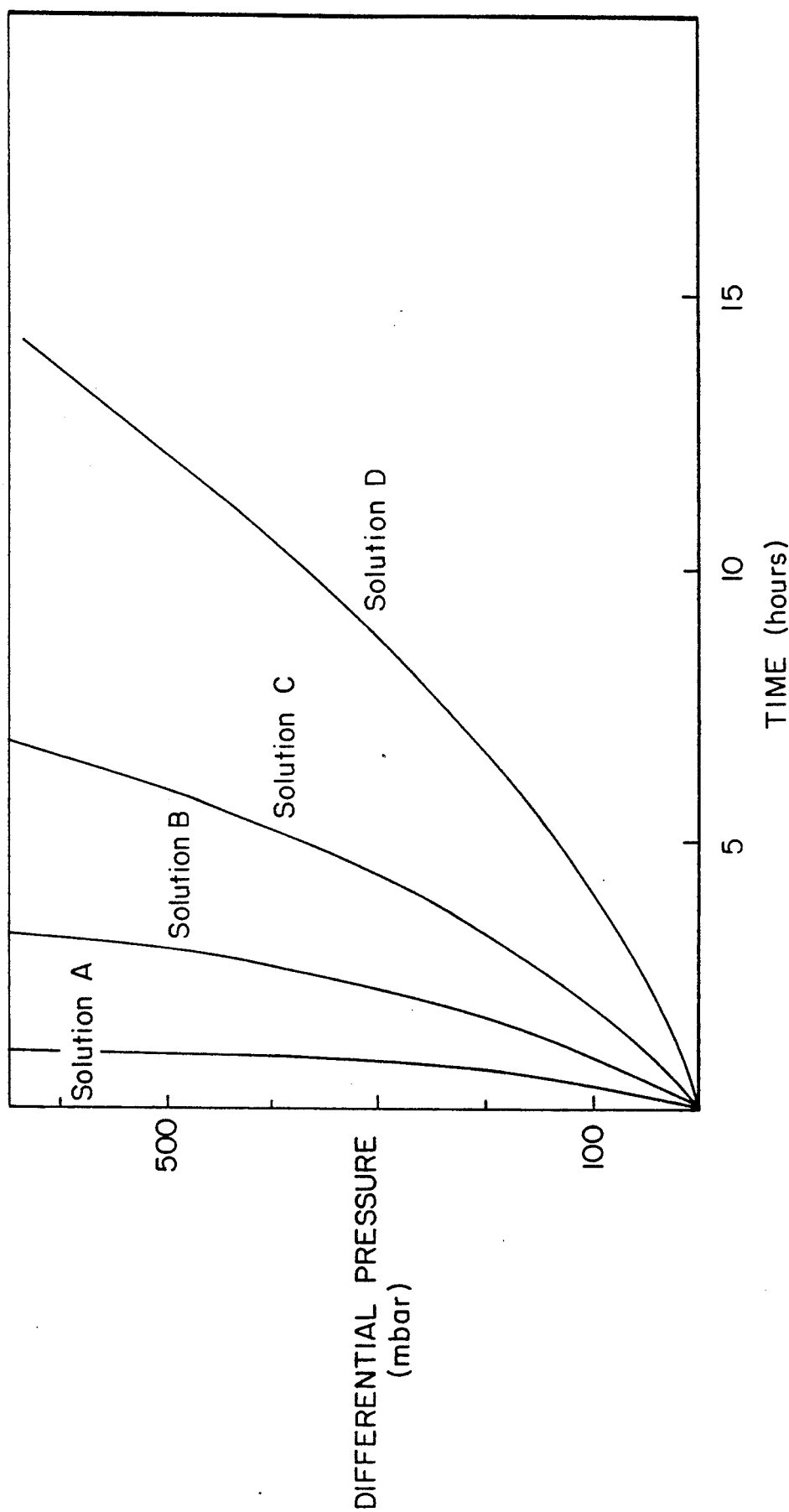
FIG. 2 describes the results of the filterability tests of example 3.

FIG. 2 shows the filterability of solutions prepared from scleroglucan powders to which surfactants have been added by direct incorporation or by incorporation in the coagulum.

Figure 3:
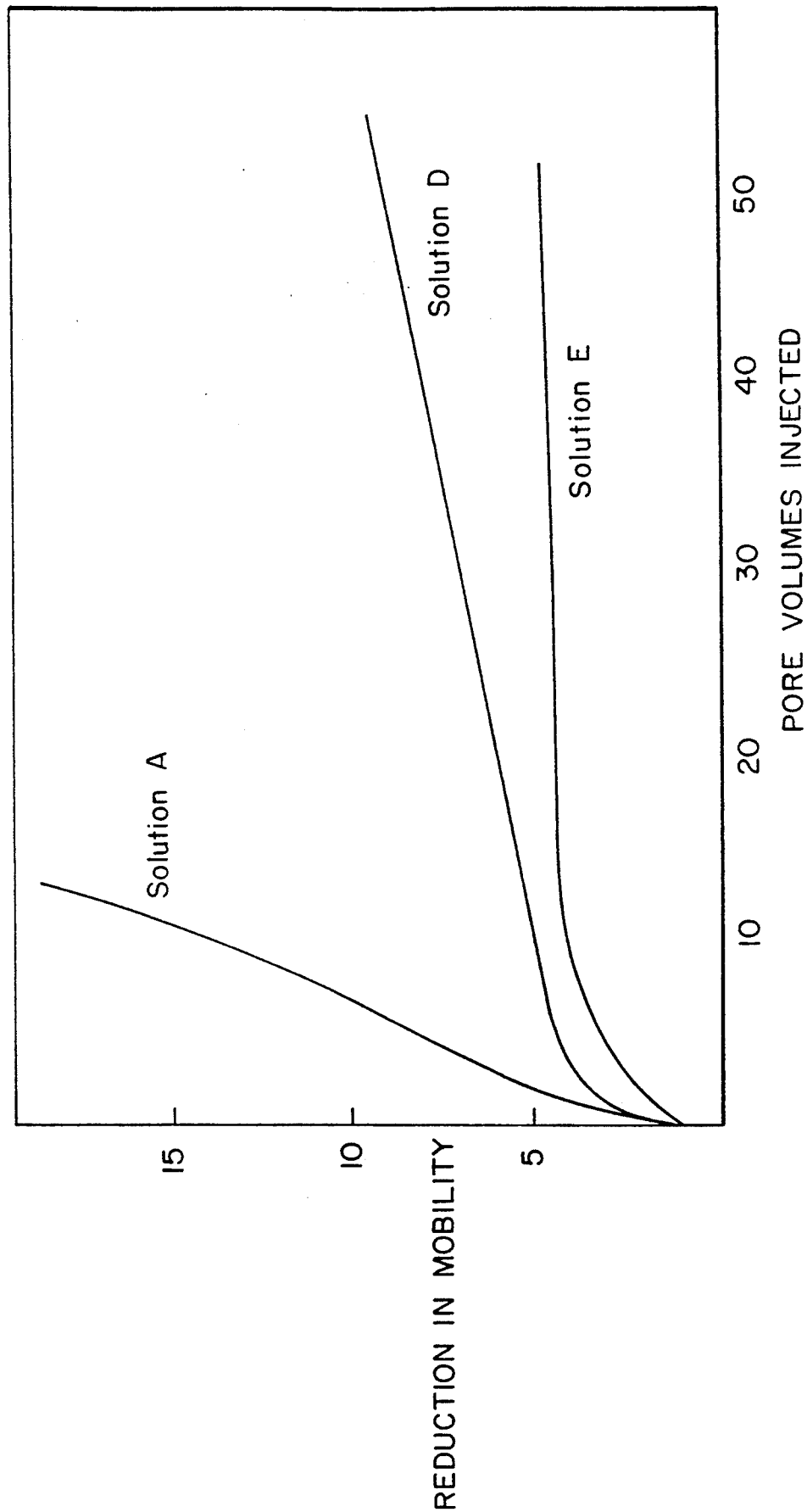
FIG. 3 describes results of the injectivity test of example 6.

FIG. 3 shows the injectivity of solutions prepared from scleroglucan powders to which surfactants have been added by incorporation in the coagulum.

EXAMPLE 1

Direct incorporation of surfactant in a scleroglucan powder

Tests were carried out to determine the quantity of surfactant which could be incorporated in the scleroglucan powder without modifying its consistency.

The dry scleroglucan powder (Actigum CS11 marketed by Sanofi Bio Industries) is introduced into a mechanical mixer operating at low speed, followed slowly by the surfactant (BASF oxyethylenated nonylphenol AP 20) dissolved in a small quantity of isopropanol containing 20% of water. After a few minutes, mixing, the polymer is extracted from the mixer and dried in a vacuum oven at 60° C. for 12 hours. The test is reproduced with different ratios of scleroglucan to surfactant. The result of the tests is shown below:

| Ratio* Scleroglucan | 100 | 100 | 100 | 100 | 100 |
|---|---|---|---|---|---|
| Surfactant | 10 | 25 | 30 | 40 | 60 |
| Consistency | Dry | | | pasty | |

*by weight

It appears that above 25% of surfactant AP 20, relative to the weight of initial scleroglucan, the product loses its dry consistency for a pasty appearance which is not easily compatible with a commercial use.

EXAMPLE 2

Incorporation of surfactant in a scleroglucan coagulum and preparation of the corresponding scleroglucan powder The tests are intended to determine the quantity of surfactant which can be incorporated in the coagulum without affecting the consistency of the dry powder derived from it.

A quantity of isopropanol containing 20% of water, equal to 1.5 times the volume of ferment, is added with stirring to a ferment containing 15 g/l of scleroglucan polymer, treated by filtration to remove the mycelium from it. The precipitate obtained or coagulum is then drained on a cloth filter, washed twice with isopropanol containing 20% of water and then drained again on a cloth filter.

The scleroglucan coagulum is recovered and treated with BASF oxyethylenated nonylphenol AP 20 under the same conditions as those described in Example 1.

In contrast to what is described in Example 1, it is found that it is possible to obtain by incorporating surfactant AP 20 a scleroglucan powder of dry consistency up to 40% of surfactant relative to the weight of initial scleroglucan. It is clearly demonstrated that the use of coagulum makes it possible to reinforce the content of surfactant incorporated in the scleroglucan without affecting its appearance.

EXAMPLE 3

Filterability of the solutions prepared from scleroglucan powders to which surfactants have been added by direct incorporation or by incorporation in the coagulum Filterability tests were performed with solutions of polymers prepared according to Examples 1 and 2 in order to verify the effectiveness of the incorporation of surfactants in the coagulum in comparison with direct incorporation.

The polymer solutions are prepared as follows. A sufficient quantity of powder is first of all added to reconstituted seawater (ASTM standard designation D 11 41 50 T, modified to have a pH of 7.2) to obtain a so-called master solution, whose concentration reaches 5 g/l of scleroglucan active substance. This mixing is performed at 60° C. with stirring (4700 rev/min propeller stirrer) for 30 min. The solution thus obtained is centrifuged to remove the dissolved air and then sheared by being passed through a series of perforated plates of 0.7, 0.5 and 0.3 mm diameter at a pressure of 6 bars of nitrogen.

The operation is repeated three times. The master solution thus prepared is then diluted so as to obtain a concentration of 400 ppm (0.4 g/l) of scleroglucan active substance. This dilution is obtained by adding the master solution to a sufficient quantity of reconstituted seawater subjected for 3 min to the stirring of a Turax turbine running at 3000 rev/min. The solution thus prepared is then subjected to the filterability test after degassing by suction under vacuum.

The filterability test consists in injecting the polymer solution under low shear gradient conditions and at 25° C. through a filtration membrane made of cellulose acetate with a mean pore diameter of 5 micrometers and in measuring the pressure difference around the filter membrane as a function of time.

Four solutions were tested for this example:
solution A prepared exclusively with untreated scleroglucan,
solution B prepared exclusively with scleroglucan treated by direct incorporation of 10% of surfactant-/AP 20,
solution C prepared exclusively with scleroglucan treated by direct incorporation of 25% of surfactant AP20,
solution D prepared exclusively from scleroglucan treated by incorporation of 20% of surfactant AP20 in the coagulum.

The results of the filterability test applied to these different solutions are shown in FIG. 2. It is found that the incorporation of the surfactant in the coagulum improves the filterability of the scleroglucan solutions more than the direct incorporation and that this effect is obtained with a smaller quantity of surfactant.

EXAMPLE 4

Filterability of the solutions prepared from scleroglucan powders to which surfactants have been added by incorporation in the coagulum or by addition to the solution Example 3 was repeated with solution D and solution A into which increasing quantities of surfactant AP 20 were introduced until the result of the filtration test was analogous between solution D and the solution A containing added surfactant. It is found that it is necessary to introduce 80% of surfactant AP 20 relative to the scleroglucan active substance to obtain a filterability analogous to that of solution D. It is thus confirmed that the incorporation of surfactant in the polymer solution is not a satisfactory technique.

EXAMPLE 5

Dispersibility of scleroglucan powders to which surfactants have been added by incorporation in the coagulum Tests were carried out to evaluate the effect of the incorporation of the surfactant in the coagulum on the dispersibility of the scleroglucan powder.

Solutions A and D are subjected to filtration through a filtration membrane made of polycarbonate with a mean pore diameter of 1.2 micrometers under a pressure of four bars of nitrogen. This treatment has the advantage of retaining on the membrane the microgels present in the solution and of producing a solution which is representative of the solution propagating in the reservoir.

The viscosity of solutions A and D is next measured before and after filtration on the polycarbonate membrane. The viscosity measurements are performed in the Low-Shear viscometer at three different shears and at a temperature of 25° C.

The table below collates the measurements performed on solutions A and D before and after treatment on a 1.2-micron membrane.

|  |  | Shear in $s^{-1}$ | 10 | 1 | 0.1 |
|---|---|---|---|---|---|
| Viscosity in $Pa \times 10^{-3}$ | of solution A before treatment | | 14.5 | 33.4 | 48.2 |
| | of solution A after treatment | | 11.5 | 23.2 | 29 |
| | of solution D before treatment | | 11.8 | 18.2 | 20.4 |
| | of solution D after treatment | | 11.7 | 17.6 | 18.8 |

It is found that the treatment of solution A causes a large decrease in the initial viscosity. This decrease is characteristic of the removal of the microgels which considerably increase the viscosity of the polymer solutions at low shear rates. The viscosity of solution D, on the other hand, is little changed by the treatment, which demonstrates a low microgel content in the solution. This low microgel content clearly shows that the incorporation of surfactants improves the dispersion of the scleroglucan powder in water.

EXAMPLE 6

Injectivity of the solutions prepared from scleroglucan powder, to which surfactants have been added by incorporation in the coagulum Injectivity tests were carried out with polymer solutions prepared according to Example 2 in order to verify the injectivity of these solutions into a natural porous medium.

Solutions A and D and solution D originating from the treatment performed according to Example 5 (filtration on a 1.2-micrometer membrane) and here called solution E were employed for these injectivity tests.

The injectivity test consists in injecting the polymer solution under low shear rate conditions and at 25° C. through a natural porous medium packaged in the form of a bar of small dimensions. The natural porous medium generally employed for a test of this type is Berea sandstone. A Berea sandstone of low permeability (150 mD), representative of the reservoirs to be treated, was chosen for testing the injectivity of the polymer solutions prepared according to the invention.

This method makes it possible to measure the reduction in mobility (ratio of the reduction in the water permeability of the medium after flushing with the polymer solution to the reduction in the initial water permeability of the sample) in the porous medium as a function of the solution volume injected, expressed as the number of times the traversed pore volume. A steady or slightly increasing reduction in mobility is the sign of good injectivity. A reduction in mobility which increases strongly with the injected volume is the sign of a blocking character of the polymer solution.

The results of the injectivity test as applied to solutions A, D and E are shown in FIG. 3. It is found that solutions D and E are injectable, whereas solution A is blocking. It is therefore confirmed that the incorporation of surfactants in the coagulum makes it possible to produce scleroglucan powders of good injectivity, which can be employed directly on site.

We claim:

1. A process for improving the dispersibility and filterability of water-soluble fermentation polymers packaged in powder form, comprising mixing a solution containing said polymer with sufficient volume of a non-solvent to precipitate said polymer in coagulum form, precipitating said coagulum, and contacting said coagulum with at least one surface-active agent capable of improving dispersibility and filterability.

2. The process according to claim 1, wherein said surface-active agent is incorporated into said coagulum, and further comprising removing a liquid phase impregnated in said coagulum by pressing said coagulum to obtain a resulting product, breaking said resulting product into pieces, and drying and grinding said pieces until a powder is obtained.

3. The process according to claim 2, wherein said surface-active agent is incorporated into said coagulum by contacting said surface-active agent and said coagulum in a mixer.

4. The process according to claim 2, wherein said surface-active agent is pre-dissolved in a minimum quantity of said non-solvent, optionally in the presence of water.

5. The process according to claim 1, wherein said polymer is xanthan.

6. The process according to claim 1, wherein said polymer is scleroglucan.

7. The process according to claim 6, wherein said scleroglucan is obtained by isolating said scleroglucan from a fermentation medium after filtration of the mycelium of a producer fungus.

8. The process according to claim 1, wherein said non-solvent is organic.

9. The process according to claim 8, wherein said organic non-solvent is isopropanol.

10. The process according to claim 1, wherein said surface-active agent consists either of at least one anionic surfactant, at least one non-ionic surfactant, or of a mixture of the two types of surfactants.

11. The process according to claim 10, wherein said surfactant has a lipophilic character characterized by a hydrophile-lipophile balance lower than 18.

12. The process according to claim 11, wherein said surfactant is selected from the group consisting of fatty acid soaps, alkali metal alkyl sulfates, polyoxyethylenated fatty alcohol sulfates, polyoxyethylenated alkylphenol sulfates, polyoxyethylenatedarylalkylphenol sulfates, phosphoric esters of polyoxyethylenated fatty alcohols, of polyoxyethylenated alkylphenols, and of polyoxyethylenated arylalkylphenols, and alkali metal sulphonates.

13. The process according to claim 11, wherein said nonionic surfactant employed are either polyoxyethylenated alkylphenols or polyoxyethylenated or polyoxypropylenated fatty alcohols or mixtures thereof, and fatty acids or polyoxyethylenated or polyoxypropylenated fatty acid aklanolamides, or mixtures thereof or polyol esters or sucrose esters.

14. The process according to claim 13, wherein said surfactants are chosen from polyoxyethylenated mono-, di- or trialkylphenols containing between 16 and 24 polyoxyethylene units.

15. The process according to claim 11, wherein said hydrophile-lipophile balance is higher than 12.

* * * * *